(12) United States Patent
Niklaus et al.

(10) Patent No.: US 11,871,145 B2
(45) Date of Patent: Jan. 9, 2024

(54) OPTIMIZATION OF ADAPTIVE CONVOLUTIONS FOR VIDEO FRAME INTERPOLATION

(71) Applicant: Adobe Inc., San Jose, CA (US)

(72) Inventors: Simon Niklaus, San Jose, CA (US); Oliver Wang, Seattle, WA (US); Long Mai, San Jose, CA (US)

(73) Assignee: Adobe Inc., San Jose, CA (US)

( * ) Notice: Subject to any disclaimer, the term of this patent is extended or adjusted under 35 U.S.C. 154(b) by 222 days.

(21) Appl. No.: 17/223,945

(22) Filed: Apr. 6, 2021

(65) Prior Publication Data

US 2022/0321830 A1    Oct. 6, 2022

(51) Int. Cl.
| | |
|---|---|
| *H04N 7/01* | (2006.01) |
| *G06N 3/08* | (2023.01) |
| *G06T 5/20* | (2006.01) |
| *G06T 5/50* | (2006.01) |

(Continued)

(52) U.S. Cl.
CPC .............. *H04N 7/0135* (2013.01); *G06N 3/04* (2013.01); *G06N 3/08* (2013.01); *G06T 5/002* (2013.01); *G06T 5/003* (2013.01); *G06T 5/20* (2013.01); *G06T 5/50* (2013.01); *G06T 2207/10016* (2013.01); *G06T 2207/20004* (2013.01); *G06T 2207/20081* (2013.01); *G06T 2207/20084* (2013.01); *G06T 2207/20212* (2013.01)

(58) Field of Classification Search
CPC .......... H04N 7/0135; G06N 3/04; G06N 3/08; G06N 3/045; G06N 3/088; G06T 5/002; G06T 5/003; G06T 5/20; G06T 5/50; G06T 2207/10016; G06T 2207/20004; G06T 2207/20081; G06T 2207/20084; G06T 2207/20212

See application file for complete search history.

(56) References Cited

U.S. PATENT DOCUMENTS

| | | | |
|---|---|---|---|
| 10,491,856 B2 * | 11/2019 | Schroers | G06N 3/08 |
| 2019/0289257 A1 * | 9/2019 | Schroers | H04N 7/0135 |
| 2020/0012940 A1 * | 1/2020 | Liu | H04N 7/0135 |

(Continued)

FOREIGN PATENT DOCUMENTS

CN    110809126    * 2/2020

OTHER PUBLICATIONS

Bao, Wenbo et al.; "Depth-Aware Video Frame Interpolation"; In IEEE Conference on Computer Vision and Pattern Recognition, arXiv:1904.00830v1, 2019, 10 pages.

(Continued)

*Primary Examiner* — Andrae S Allison
(74) *Attorney, Agent, or Firm* — Nicholson De Vos Webster & Elliott LLP

(57) ABSTRACT

Embodiments are disclosed for video image interpolation. In some embodiments, video image interpolation includes receiving a pair of input images from a digital video, determining, using a neural network, a plurality of spatially varying kernels each corresponding to a pixel of an output image, convolving a first set of spatially varying kernels with a first input image from the pair of input images and a second set of spatially varying kernels with a second input image from the pair of input images to generate filtered images, and generating the output image by performing kernel normalization on the filtered images.

18 Claims, 11 Drawing Sheets

(51) Int. Cl.
*G06T 5/00* (2006.01)
*G06N 3/04* (2023.01)

(56) References Cited

U.S. PATENT DOCUMENTS

| | | | |
|---|---|---|---|
| 2021/0142448 A1* | 5/2021 | Yao | G06N 3/082 |
| 2022/0067994 A1* | 3/2022 | Neuberger | G06T 5/005 |
| 2022/0101494 A1* | 3/2022 | Mardani Korani | G06V 10/82 |
| 2022/0198612 A1* | 6/2022 | Weinmann | G06T 3/40 |
| 2022/0201242 A1* | 6/2022 | Lu | H04N 7/0137 |
| 2022/0207656 A1* | 6/2022 | Yao | G06N 20/10 |

OTHER PUBLICATIONS

Cheng, Xianhang et al.; "Multiple Video Frame Interpolation via Enhanced Deformable Separable Convolution"; arXiv:2006.08070, 2020, 18 pages.

Choi, Myungsub et al.; "Channel Attention is All You Need for Video Frame Interpolation", In AAAI Conference on Artificial Intelligence, 2020, 9 pages.

Lee, Hyeongmin et al.; "AdaCof: Adaptive Collaboration of Flows for Video Frame Interpolation", In IEEE Conference on Computer Vision and Pattern Recognition, arXiv:1907.10244v3, 2020, 10 pages.

Niklaus, Simon et al.; "Context-Aware Synthesis for Video Frame Interpolation", In IEEE Conference on Computer Vision and Pattern Recognition, arXiv:1803.10967v1, 2018, 10 pages.

Niklaus, Simon et al.; "Softmax Splatting for Video Frame Interpolation", In IEEE Conference on Computer Vision and Pattern Recognition, arXiv:2003.05534v1, 2020, 10 pages.

Niklaus, Simon et al.; "Video Frame Interpolation via Adaptive Separable Convolution", In IEEE International Conference on Computer Vision, arXiv:1708.01692v1, 2017, 10 pages.

Park, Junheum et al.; "BMBC: Bilateral Motion Estimation with Bilateral Cost Volume for Video Interpolation", In European Conference on Computer Vision, arXiv:2007.12622v1, 2020, 16 pages.

* cited by examiner

| | venue | Middlebury Baker et al. | | Vimeo-90K Xue et al. | | UCF101-DVF Liu et al. | | Xiph - 1K (4K resized to 1K) | | Xiph - 2K (4K resized to 2K) | |
|---|---|---|---|---|---|---|---|---|---|---|---|
| | | PSNR ↑ | absolute rank | PSNR ↑ | absolute rank | PSNR ↑ | absolute rank | PSNR ↑ | absolute rank | PSNR ↑ | absolute rank |
| SepConv - $L_1$ | ICCV 2017 | 35.73 | 8th of 10 | 33.80 | 10th of 10 | 34.79 | 9th of 10 | 36.22 | 9th of 10 | 34.77 | 8th of 10 |
| CtxSyn - $L_{lap}$ | CVPR 2018 | 36.93 | 4th of 10 | 34.39 | 4th of 10 | 34.62 | 10th of 10 | 36.87 | 3rd of 10 | 35.72 | 3rd of 10 |
| DAIN | CVPR 2019 | 36.69 | 7th of 10 | 34.70 | 6th of 10 | 35.00 | 7th of 10 | 36.78 | 5th of 10 | 35.93 | 2nd of 10 |
| CAIN | AAAI 2020 | 35.11 | 10th of 10 | 34.65 | 7th of 10 | 34.98 | 8th of 10 | 36.21 | 10th of 10 | 35.16 | 4th of 10 |
| EDSC - $L_C$ | arXiv 2020 | 36.82 | 5th of 10 | 34.83 | 4th of 10 | 35.13 | 6th of 10 | 36.73 | 6th of 10 | OOM | OOM |
| AdaCoF | CVPR 2020 | 35.72 | 9th of 10 | 34.35 | 9th of 10 | 35.16 | 4th of 10 | 36.26 | 8th of 10 | 34.82 | 7th of 10 |
| SoftSplat - $L_{lap}$ | CVPR 2020 | 38.42 | 1st of 10 | 36.10 | 1st of 10 | 35.39 | 1st of 10 | 37.96 | 1st of 10 | 36.63 | 1st of 10 |
| BMBC | ECCV 2020 | 36.79 | 6th of 10 | 35.06 | 2nd of 10 | 35.16 | 4th of 10 | 36.59 | 7th of 10 | OOM | OOM |
| Ours - $L_{Cx}$ | N/A | 37.28 | 3rd of 10 | 34.83 | 4th of 10 | 35.24 | 3rd of 10 | 36.83 | 4th of 10 | 34.84 | 6th of 10 |
| Ours - $L_{Cx}$ - 8x | --- | 37.46 | 2nd of 10 | 34.97 | 3rd of 10 | 35.29 | 2nd of 10 | 37.00 | 2nd of 10 | 35.10 | 5th of 10 |

*FIG. 8*

OPTIMIZATION OF ADAPTIVE CONVOLUTIONS FOR VIDEO FRAME INTERPOLATION

BACKGROUND

Video frame interpolation is an important technique with applications in frame-rate conversion, video editing, novel view interpolation, video compression, and motion blur synthesis. Video frame interpolation includes various techniques that, given two frames, synthesize one or more intermediate frames in between the input frames. This is useful, for example, to increase the framerate of a video, slow down a video, match the framerate of the video to the refresh rate of the monitor it is displayed on, etc. While the performance of video frame interpolation approaches has seen steady improvements, research efforts have become increasingly complex.

Conventional video frame interpolation approaches are based on optical flow. These approaches identify how pixels move between two frames and generate an intermediate frame in which those pixels are moved part way. Other video frame interpolation approaches are kernel-based interpolation. In such approaches, a kernel is applied to each pixel which determines the influence of neighboring pixels on a given pixel. Machine learning is used to identify kernel coefficients for each kernel. This can lead to significant processing time, particularly as the size of the kernels used increases. Additionally, such techniques can lead to unwanted changes in the appearance of the input video, such as brightness changes. Further, the training techniques used to train the machine learning model to predict kernel coefficients do not always result in models that are generalizable to arbitrary inputs, resulting in wasted training time and requiring further, or new, model training.

These and other problems exist with regard to video frame interpolation in electronic systems.

SUMMARY

Introduced here are techniques/technologies that provide a number of enhancements to a video interpolation framework. These enhancements improve the interpolation performance of even older and simpler video interpolation frameworks to near state-of-the-art. For example, in some embodiments, a kernel prediction network estimates kernel coefficients for separable one-dimensional kernels based on a pair of video frame inputs. These one-dimensional kernels are then applied to the input frames to obtain a filtered frame that represents an interpolated intermediate frame from a time in between the two input frames. Kernel normalization is applied to the filtered intermediate frame by applying the kernels to a singular mask. This has a similar effect to constraining the kernel coefficients to sum to one and significantly improves interpolation quality.

Additionally, the neural network is trained using a contextual loss function. This loss function is based on a comparison of the intermediate frame and a ground truth frame both in the color space and the feature space. The feature space captures the context of each pixel, and this forces the neural network to learn to predict kernel coefficients based on the actual motion between the input frames. Other enhancements also improve interpolation quality, such as delayed padding, self-ensembling, input normalization, etc., as discussed further herein.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 8 illustrates a chart showing performance improvements of optimizations to kernel-based frame interpolation techniques, in accordance with an embodiment.

DETAILED DESCRIPTION

Figure 1:
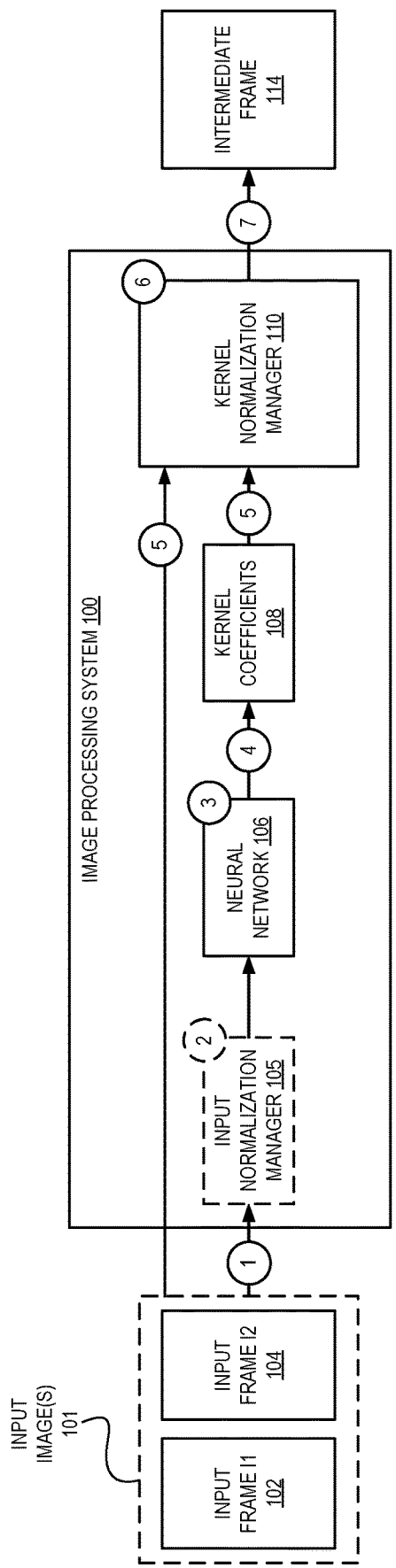
FIG. 1 illustrates a diagram of a process of video frame interpolation in accordance with one or more embodiments.

One or more embodiments of the present disclosure include an image processing system that uses machine learning to perform image frame interpolation. In particular, one or more embodiments include optimizations to kernel-based video frame interpolation approaches that greatly improve interpolation quality. Kernel-based video frame interpolation includes adaptive convolutions, also referred to as kernel prediction, dynamic filtering, basis prediction, or local attention. Such techniques jointly perform motion estimation and motion compensation in a single step by estimating spatially varying kernels for each output pixel and convolving these kernels with the input frames to generate the intermediate frame. Better interpolation quality is obtained from using larger kernel sizes, as larger kernels can account for larger motion between the frames. However, this results in a significant memory demand to store the kernels, and this demand increases quadratically with kernel size.

One solution to address this problem is to use separable kernels. Separable kernels comprise pairs of one-dimensional kernels, one horizontal and one vertical, which are predicted instead of two-dimensional kernels. Each one-dimensional kernel pair can be convolved to obtain a two-dimensional kernel for convolution with the input frames. Estimating two one-dimensional kernels, rather than a two-dimensional kernel, for each output pixel significantly reduces the memory required and improves processing speed. However, these techniques can introduce other visual artifacts that reduce interpolation quality. For example, kernel normalization is used to ensure that the output frame is neither brighter, nor darker, than the input frames. This is done by constraining the kernel coefficients to sum to one. This is readily accomplished using a SoftMax layer when the entire two-dimensional kernel is being predicted. However, when using separable kernels, there is no mechanism for enforcing this constraint. This results in varying brightness levels of the interpolated frames and lower visual quality. Additionally, the kernel prediction models used in prior techniques are not trained to account for the true motion of the input frames. This can hurt the generalizability of the trained models, resulting in poorer kernel predictions for arbitrary inputs when the model is deployed.

Embodiments address these and other deficiencies of prior techniques through a number of optimizations. For example, the kernel prediction model is trained using contextual training techniques that utilizer a contextual loss function to force the model to learn based on the true motion of the input frames. Additionally, kernel normalization is performed on the filtered input frames to generate the output frame. These optimizations can be applied to various kernel-based approaches and result in substantial improvement in interpolation quality. For example, such optimizations applied to older and simpler kernel-based techniques, such as Sep-Conv, result in near state-of-the-art performance, as discussed further below.

Although embodiments are described with respect to improvements to video frame interpolation, the described techniques may also be used to improve the performance of other related applications, such as burst image denoising to align and merge multiple images, in denoising Monte Carlo renderings by taking weighted averages of noisy neighborhoods, in the modelling of a broad class of image transformations, in optical flow upsampling and joint image filtering, in video prediction where adaptive kernels can also model uncertainty, in deblurring to model spatially-varying blur, or super-resolution where they can be used to merge multiple observations with sub-pixel accuracy.

FIG. 1 illustrates a diagram of a process of video frame interpolation in accordance with one or more embodiments. As shown in FIG. 1, image processing system 100 receives a pair of consecutive input frames: input frame 102 and input frame 104. The input frames may be extracted from a digital video. In various embodiments, digital video can include any digital visual media comprising a plurality of frames which, when played, comprises a moving visual representation (or image) of a story, event, picture, illustration, icon, and/or symbol. To illustrate, a digital video can include, but is not limited to, a digital file with the following file extensions: FLV, SWF, AVI, WMV, MOV, QT, MKV, MP4, or AVCHD. In some embodiments, the consecutive frames may be selected by a user to be provided to image processing system 100. Additionally, or alternatively, the user or other entity may provide a digital video file to the image processing system 100. The image processing system may then extract frames from the digital video file to be processed.

As shown in FIG. 1, at numeral 1, input image(s) 101 are provided to neural network 106. Embodiments are generally discussed with respect to performing image interpolation, in which the input images 101 include a pair of input frames, input frames $I_1$ 102 and $I_2$ 104, which are extracted from a digital video. However, the techniques described herein may also be used with other kernel-based image processing techniques, such as burst image denoising, joint image filtering, or video prediction. Which may include more or fewer images as inputs and/or which may be obtained from a source other than a digital video. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. Additional details with respect to the use of neural networks within the image processing system are discussed below.

Optionally, in some embodiments, the input frames are first normalized by providing the input frames to input normalization manager 105. The contrast and brightness of the input frames should not affect the quality of the synthesized results. In other words, the network should be invariant to contrast and brightness. While it would be difficult to enforce such an invariance during training, the desired invariance can be achieved by normalizing the contrast and brightness of the input frames before they are provided to neural network 106. In some embodiments, for image synthesis via adaptive convolutions, one can skip the denormalization step by applying the adaptive convolutions on the original input frames and only normalizing them when feeding them to the neural network that predicts the spatially varying kernels.

Input normalization manager 105 normalizes the input frames by shifting and rescaling their intensity values to have zero mean and unit standard deviation. This can be performed in a number of ways. In some embodiments, two input frames are normalized jointly while treating each color channel separately. That is, for each color channel, the input normalization manager 105 computes the mean and standard deviation of $I_1$ and $I_2$ as if they were one image. In some embodiments, the intermediate frame 114 can be denormalized after it has been generated. Experimentally, this input normalization was observed to improve the interpolation quality on the Middlebury benchmark examples with publicly known ground truth by 0.31 dB.

Given two consecutive frames $I_1$ and $I_2$ from a video, the frame interpolation task is to synthesize an intermediate frame $\hat{I}$ 114 that is temporally centered between the given input frames. In some embodiments, neural network 106 includes a kernel prediction network trained to predict kernel coefficients for spatially varying kernels. As discussed, larger kernels yield better interpolation quality, but also require significant amounts of memory for the kernel coefficients. Accordingly, in some embodiments, the neural network 106 is trained to estimate pairs of one-dimensional filter kernels $\langle K_{1,h}, K_{1,v}, K_{2,h}, K_{2,v} \rangle$ for each pixel in the output frame $\hat{I}$ 114, as shown below.

$$\langle K_{1,h}, K_{1,84}, K_{2,h}, K_{2,v} \rangle = \phi(I_1, I_2)$$

where $\phi$ represents neural network 106. For example, at numeral 3, the neural network processes the input frames to estimate the kernel coefficients 108 of a pair of one-dimensional kernel filters for each pixel of the intermediate frame 114, which are output at numeral 4. These spatially varying kernels can then be used to process the input frames to yield $\hat{I}$ 114 through an adaptive separable convolution operation $\varphi$.

Specifically, $I_1$ is filtered with the separable filters ⟨$K_{1,h}$, $K_{1,84}$⟩ while $I_2$ is filtered with the separable filters ⟨$K_{2,h}$, $K_{2,v}$⟩ as follows.

$$\hat{I} = \varphi(I_1, K_{1,h}, K_{1,v}) + \varphi(I_2, K_{2,h}, K_{2,v})$$

The spatially varying kernels capture motion and resampling information, which makes for an effective image formation model for frame interpolation. To be able to account for large motion, the kernels should be as large as possible. However, with larger kernels it is more difficult to estimate all coefficients. In some embodiments, the kernel size is 51 pixels by 51 pixels. In other embodiments, larger or smaller kernel sizes are used.

As shown in FIG. 1, the kernel coefficients 108 and the input frames 102, 104 are provided to kernel normalization manager 110 at numeral 5. When a kernel for a particular output pixel is applied to an input frame, it combines the colors of the pixels around the output pixel to determine the color of the output pixel. However, ideally, the brightness of the output frame should remain the same as in the input frames. If the sum of the kernel coefficients is greater than one, the result will be brighter, while if it is less than one, the result will be darker. Prior kernel-based techniques addressed this problem by using a SoftMax layer, which ensured that the predicted kernel coefficients summed to one. This was possible because the entire two-dimensional kernel was being estimated. However, where separable one-dimensional kernels are being estimated, there is no mechanism for enforcing this constraint on the two-dimensional kernel generated from the pair of one-dimensional kernels. This results in poorer interpolation quality.

As such, embodiments apply kernel normalization to the output frame using a singular mask, at numeral 6. For example, kernel normalization manager 110 uses the kernels output by neural network 106 and convolves them with an image of equal size to the frames where the value of every pixel is '1'. The filtered input frames are then divided by the filtered masks to compensate for denormalized pixel weights, as shown below.

$$\hat{I} = \frac{\varphi(I_1, K_{1,h}, K_{1,v}) + \varphi(I_2, K_{2,h}, K_{2,v})}{\varphi(1, K_{1,h}, K_{1,v}) + \varphi(1, K_{2,h}, K_{2,v})}$$

Normalizing the filtered frames by the filtered singular masks, produces a similar effect to having normalized kernels. This normalized result is then output as the intermediate frame at numeral 7. In some embodiments, this process is repeated for each pair of frames in the digital video being processed until the entire video has been processed. In some embodiments, the process may be repeated on the digital video until the desired framerate is achieved. Kernel normalization resulted in an improvement by 0.52 dB on the Middlebury benchmark examples with publicly known ground truth, as compared to prior techniques that did not implement kernel normalization as described herein.

In some embodiments, a singular prediction can be enhanced by combining the predictions of multiple transformed versions of the same input. Such transforms can include rotations, mirroring, or cropping. Any reversible image transforms can be used. Such self-ensembling can be used to enhance the frame interpolation quality. For example, the pair of frame inputs can be transformed (e.g., rotated, mirrored, cropped, etc.) and then processed again by the neural network to predict kernel coefficients. A new output image is then generated using theses kernel coefficients. This may be performed multiple times and the outputs combined (e.g., by taking the average, median, or otherwise merge the output images). Any number of predictions can be averaged in this way, though large numbers of predictions can become computationally expensive. In some embodiments, up to sixteen predictions are performed with transforms based on reversing the input frames, flipping them, mirroring them, and applying rotations by ninety degrees. This effectively smooths predictions in areas where the kernel estimation is uncertain. This can visually lead to a smooth result instead of one with visible artifacts. Experimentally, self-ensembling was found to improve interpolation performance by 0.18 dB.

Figure 2:
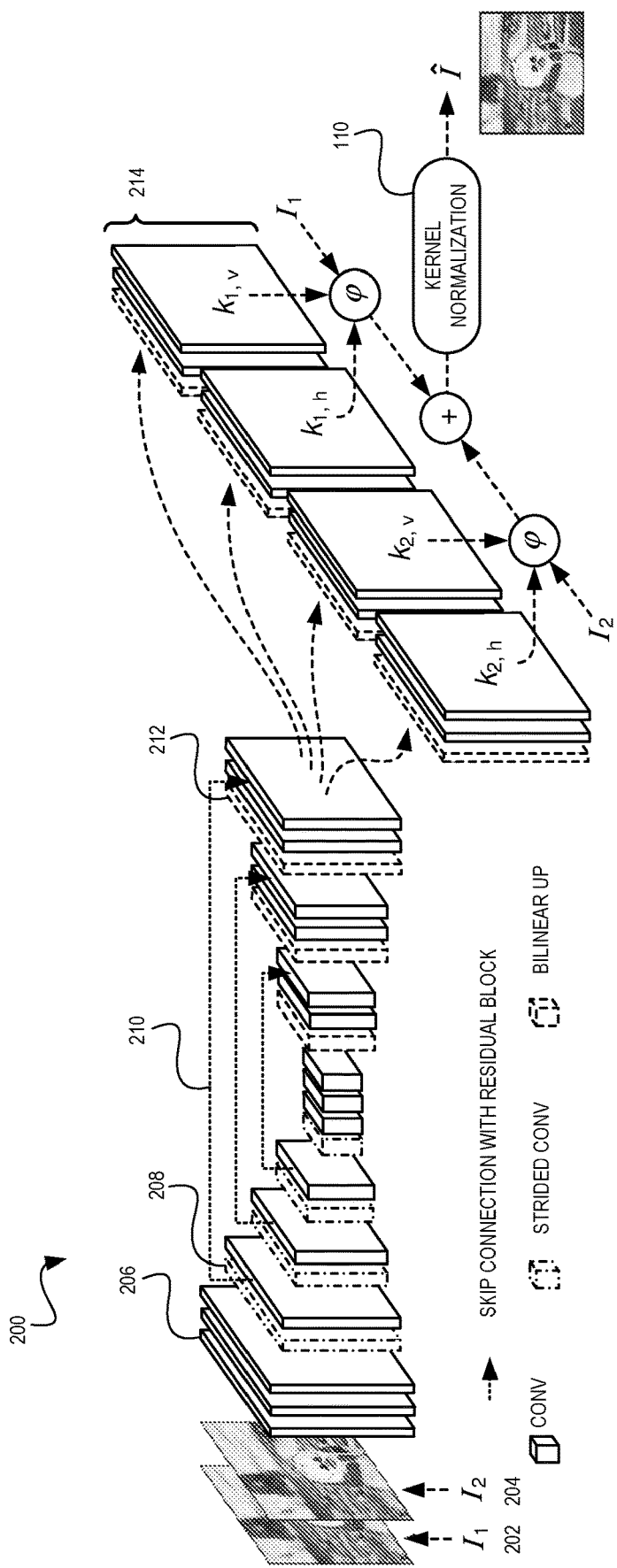
FIG. 2 illustrates a diagram of a model architecture of a machine learning model for determining kernel coefficients in accordance with one or more embodiments.

FIG. 2 illustrates a diagram of a model architecture 200 of a machine learning model for determining kernel coefficients in accordance with one or more embodiments. In some embodiments, the neural network used for kernel coefficient prediction includes an encoder-decoder network, such as a U-net architecture. In some embodiments, the activation functions used are parametric rectified linear units. The input frames 202, 204 are provided to the input convolution layers of the encoder, as shown at 206. The frames are downsampled in strided convolution layers 208 and skip connections with residual blocks connect the convolution layers of the encoder to convolution layers of the decoder. Bilinear upsampling layers are included in the decoder for upsampling. The features extracted by the encoder-decoder network are output to four sub-networks 214.

The sub-networks 214 each estimate one of the four one-dimensional kernels for each output pixel of the intermediate frame. The first layer in each sub-network includes an upsampling layer followed by convolution layers. The one-dimensional kernels are then used in adaptive separable convolutions operations $\varphi$ on the input frames. In some embodiments, a Kahan summation is used within the adaptive separable convolution operations. The filtered results are then passed to kernel normalization manager which outputs the intermediate frame $\hat{I}$. These network improvements led to a 0.42 dB improvement in terms of interpolation quality on the Middlebury benchmark examples with publicly known ground truth, as compared to the older architecture of SepConv.

Figure 3:
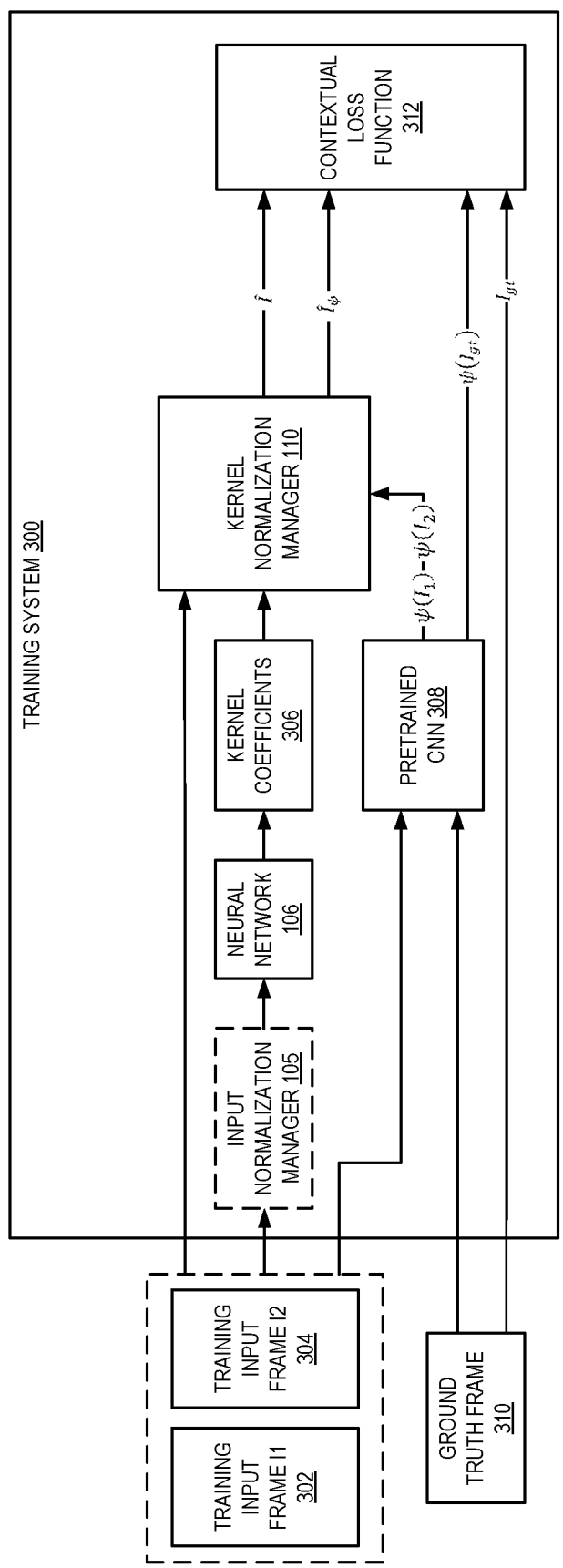
FIG. 3 illustrates a diagram of a training system for training a machine learning model to determine kernel coefficients using a context loss function in accordance with one or more embodiments.

FIG. 3 illustrates a diagram of a training system for training a machine learning model to determine kernel coefficients using a context loss function in accordance with one or more embodiments. Traditional kernel-based approaches train the kernel prediction model on a loss function in the color space. This trains the kernel prediction model to identify the correct pixel colors in the intermediate frame based on the input frames. However, such training does not force the kernel prediction model to accurately model the motion across the frames. Instead, this sometimes leads the kernel prediction model to merely index the colors of the training images and then select the correct color for the output image. Once such models are deployed and given arbitrary inputs to process, the performance of the model is found to be wanting, as the model has no prior knowledge of the real-world inputs. To address this, embodiments use a contextual loss during training which forces the kernel prediction model to learn to predict kernel coefficients based on the motion between the frames by factoring in the context of the pixels being compared.

As shown in FIG. 3, training proceeds similarly to the inference process described above with respect to FIG. 1. The training system 300 receives a pair of training input frames 302, 304. As discussed, in some embodiments the pair of input frames are normalized (e.g., to have shifted and scaled intensity values, as discussed above). The input frames, or normalized input frames depending on implementation, are then provided to neural network 106. In this example, neural network 106 is the kernel prediction model being trained. The neural network 106 processes the input frames and predicts kernel coefficients for a plurality of spatially varying kernels, one kernel associated with each pixel of the output intermediate frame Î. Kernel normalization manager 110 performs adaptive separable operations φ on the input frames using the kernels as well as on singular masks to normalize the kernels.

Additionally, the input frames are also provided to a pretrained convolutional neural network 308. Pretrained CNN may be any neural network trained to generate a feature representation that represents the context of each pixel. For example, the pretrained CNN 308 may be an off-the-shelf network ψ. In some embodiments, relu1_2 of a pretrained VGG network is used as pretrained CNN 308. The pretrained CNN processes the input frames and generates a feature representation of the intermediate input frames $\psi(I_1)$ and $\psi(I_2)$ which are then provided to kernel normalization manager 110. Kernel normalization manager 110 uses the feature representations to generate output frame $\hat{I}_\psi$. This feature representation includes the context associated with each pixel. As such, in the contextual space of the feature representation, the features of other nearby pixels are encoded for each pixel. During training, a ground truth frame $I_{gt}$ is provided and also passed through the pretrained CNN 308 to obtain a ground truth feature representation $\psi(I_{gt})$. The intermediate frame, feature representation of the intermediate frame, the ground truth frame, and the feature representation of the ground truth frame are then provided to contextual loss function 312, as shown below.

$$\mathcal{L}_{Ctx} = \|\langle \hat{I}, \alpha \cdot \hat{I}_\psi \rangle - \langle I_{gt}, \alpha \cdot \psi(I_{gt}) \rangle\|$$

where $$\hat{I} = \frac{\varphi(I_1, K_{1,h}, K_{1,v}) + \varphi(I_2, K_{2,h}, K_{2,v})}{\varphi(1, K_{1,h}, K_{1,v}) + \varphi(1, K_{2,h}, K_{2,v})}$$

$$\hat{I}_\psi = \frac{\varphi(\psi(I_1), K_{1,h}, K_{1,v}) + \varphi(\psi(I_2), K_{2,h}, K_{2,v})}{\varphi(1, K_{1,h}, K_{1,v}) + \varphi(1, K_{2,h}, K_{2,v})}$$

In some embodiments, a tradeoff weight a is applied to the feature term of the loss function. For example, a trade off weight of 0.1 was found to perform effectively, though other weights, or no weight, may also be used. This loss function is minimized, which minimizes both the difference between the prediction Î and the ground truth $I_{gt}$ in color space as well as the contextual space. Since each pixel in the contextual space not only describes the color of a single pixel but also encodes its local neighborhood, this loss effectively prevents the kernel prediction network from simply indexing pixels based on their color. Supervising the kernel prediction using this contextual loss yields an improvement of 0:18 dB on the Middlebury benchmark examples with publicly know ground truth as compared to prior techniques that relied on L1 loss.

Figure 4:
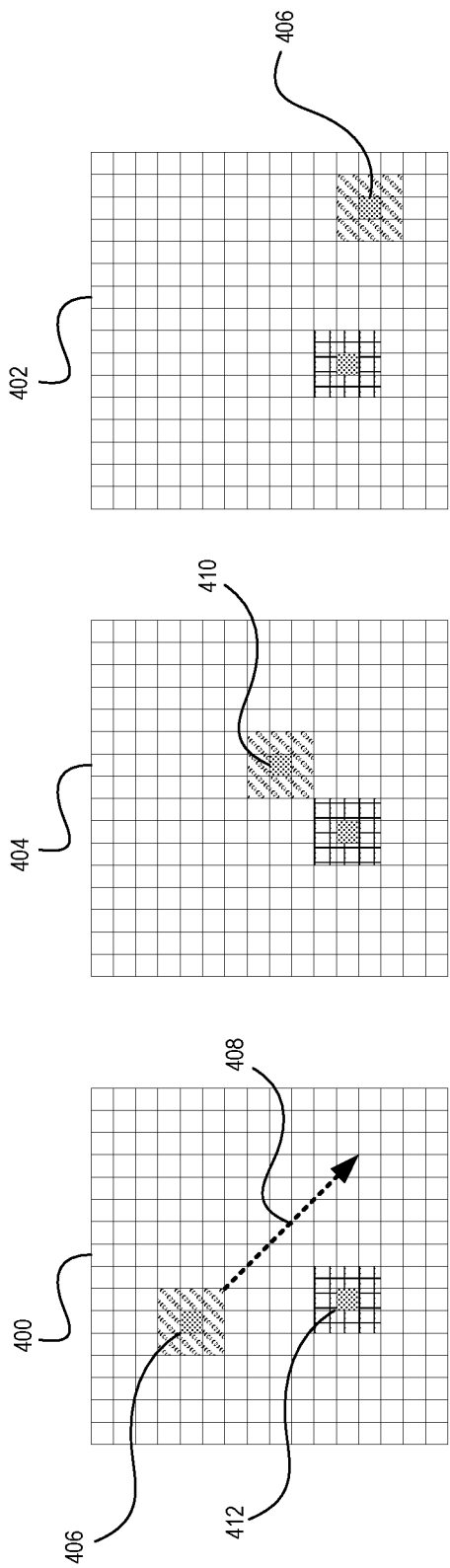
FIG. 4 illustrates an example of an intermediate frame in accordance with one or more embodiments.

FIG. 4 illustrates an example of predicting an intermediate frame in accordance with one or more embodiments. As shown in FIG. 4, a pair of input frames 400 and 402 are used to predict intermediate frame 404. As discussed, the pair of input frames includes two consecutive frames of a digital video and the predicted intermediate frame is a frame falling temporally halfway in between the input frames. As a result, pixels that move from one frame to the next, such as pixel 406, should appear partway along the path 408 traveled between the frames, as shown at 410 in intermediate frame 404. However, as discussed above, multiple pixels may be of the correct color to be used as the predicted pixel color in the intermediate frame. For example, pixel 412 has the same color as pixel 406 and if selected by the neural network would result in a low loss function value, if that loss were calculated only in the color space.

However, as discussed above, this can result in training the neural network to index (e.g., memorize) the training data and then select the pixel color that reduces the loss function, regardless of whether the selected pixel is relevant based on the actual movement observed between the frames. For example, as shown in FIG. 4, the neighboring pixels of pixel 406 are of a different color than the neighboring pixels of pixel 412 (here shown as different patterns, for simplicity of depiction). If the neural network were to use pixel 412 to predict the color of pixel 410 in intermediate frame 404, the result would score well in the color space, even though this prediction is not made based on the actual motion, as pixel 412 does not move between frames. Accordingly, introducing the contextual loss function, as discussed above, forces the neural network to consider the context of the pixels it is using to predict intermediate frame 404, which forces it to account for the actual motion.

Figure 5:
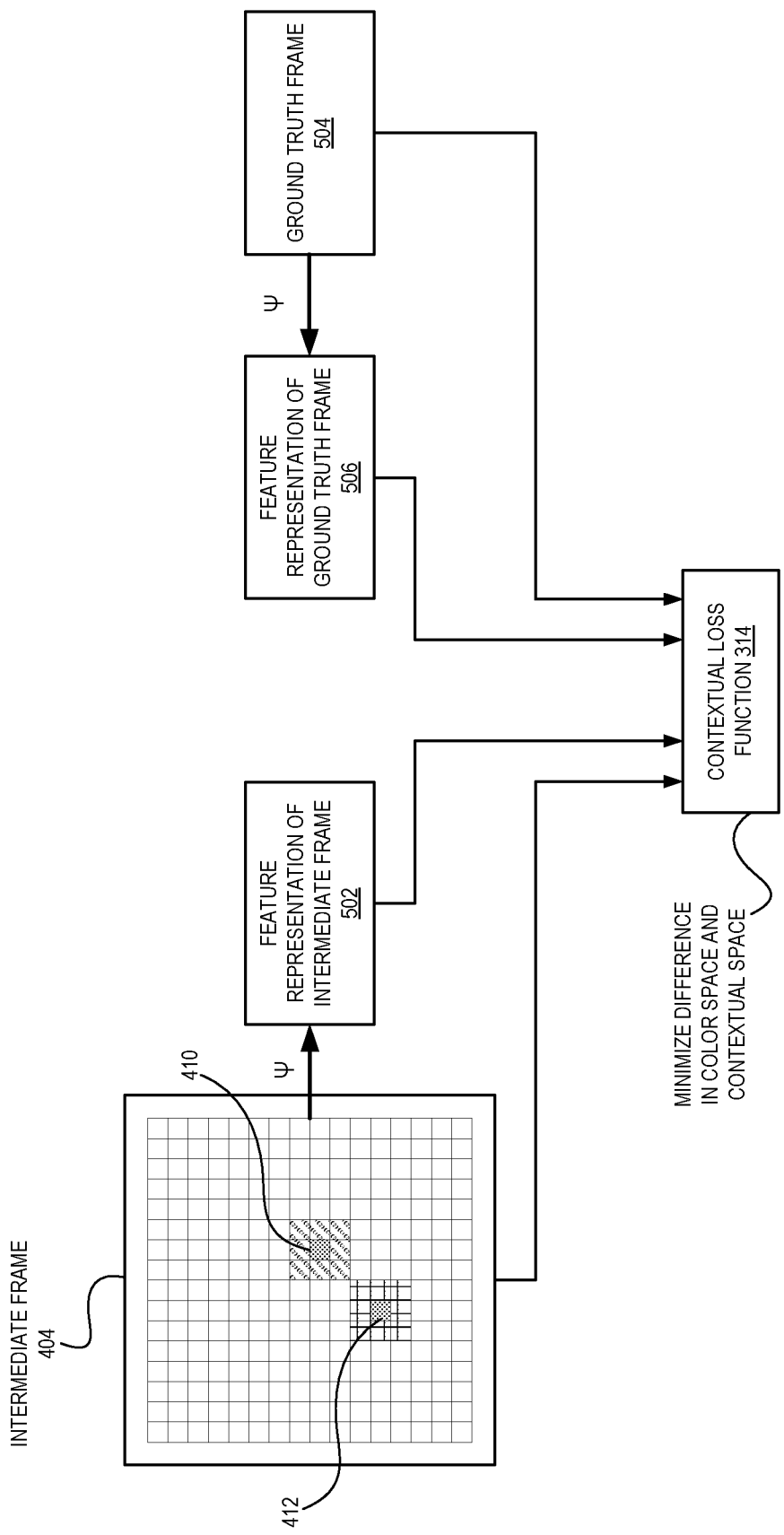
FIG. 5 illustrates an example of contextual training in accordance with one or more embodiments.

FIG. 5 illustrates an example of contextual training in accordance with one or more embodiments. As shown in FIG. 5, a feature representation 502 of the intermediate frame 404 is also generated. For example, as discussed above, the input frames are processed by a pretrained CNN to generate a feature representation of each input frame. These feature representations are then used along with the kernel coefficients to generate the feature representation of the intermediate frame. As discussed, this feature representation encodes the neighboring pixels into the representation of each pixel. Similarly, the ground truth frame is processed by the same pretrained CNN to generate a ground truth feature representation 506. When these feature representations are compared by contextual loss function 314, if 412 is used to predict the value of pixel 410, the contextual loss will be high, as the neighboring pixels of pixel 412 and pixel 406 (as shown above in FIG. 4) do not match. This forces the neural network to learn to factor in the actual motion between the frames for its predictions.

Figure 6:
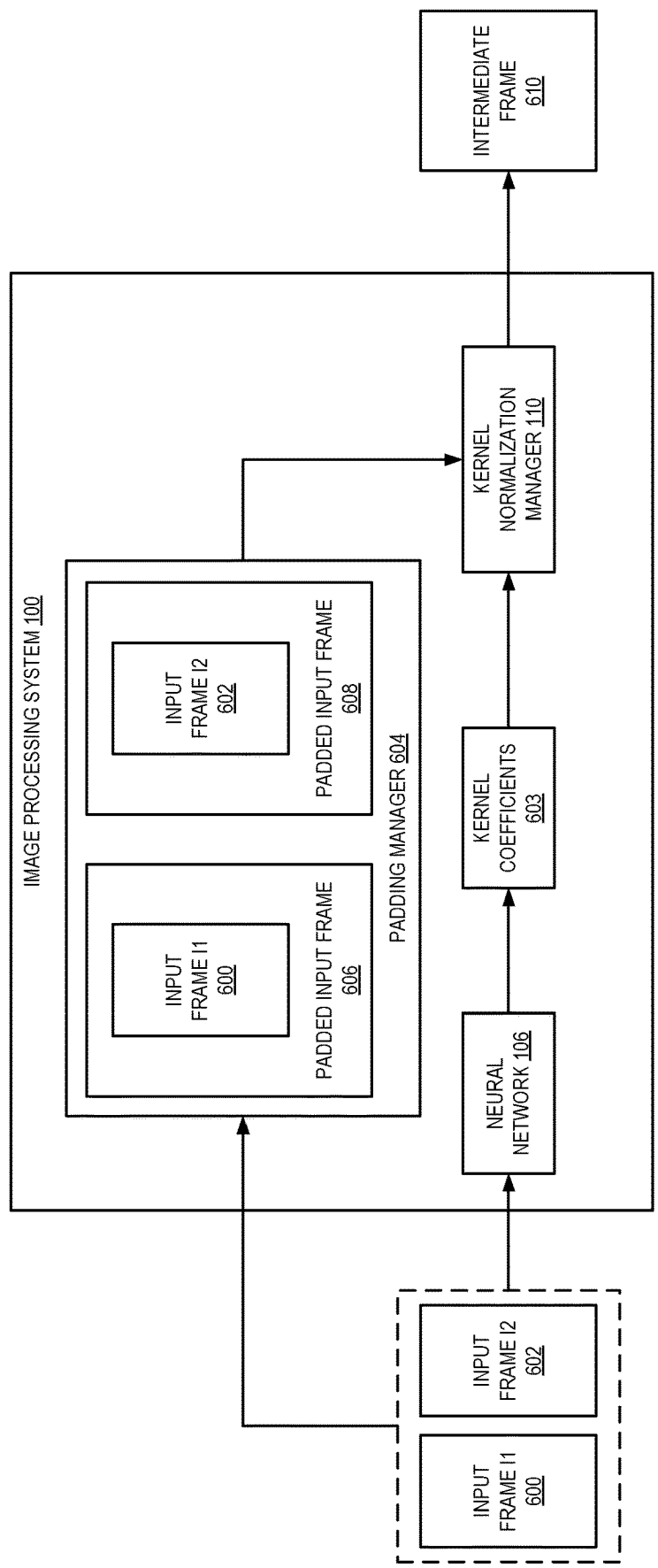
FIG. 6 illustrates a diagram of a process of video frame interpolation using delayed padding in accordance with one or more embodiments.

FIG. 6 illustrates a diagram of a process of video frame interpolation using delayed padding in accordance with one or more embodiments. In traditional systems, an input image is padded to be able to obtain the values of pixels along the edges of an image. This ensures that the output is of the same size as the input. Some padding schemes to mirroring to try to avoid darkening or brightening the edges of an image which may be introduced if the image is zero padded or one padded. However, the models typically are not trained on padded data, which causes the model to perform differently when presented with real-world data. Padding also slows down processing, as there is now more data to process.

To address these issues, embodiments delay padding until after the kernels have been predicted, as shown below.

$$\hat{I} = \varphi(\text{pad}(I_1), K_{1,h}, K_{1,v}) + \varphi(\text{pad}(I_2), K_{2,h}, K_{2,v})$$

As such, the input frames 600, 602 are used to predict the kernel coefficients 603. The input frames are then padded by padding manager 604, generating padded input frames 606 and 608. The size of the padding may vary depending on implementation. In one embodiment, the frames are padded by 25 pixels on each side. The adaptive separable convolution operation is then performed using the kernels on the padded input frames by kernel normalization manager 110 to generate intermediate frame 610. By delaying padding, computational efficiency is improved. For example, one kernel-based approach took 0.027 seconds to interpolate a frame at a resolution of 512×512 pixels. In comparison, it took 0.018 seconds when optimized with the delayed padding using the same hardware. At a resolution of 1024×1024 pixels, it took 0.083 seconds with the original padding and 0.065 seconds with the delayed padding. Additionally, delayed padding improves the quality of the interpolated results since the neural network does not have to deal with large, padded boundaries that are outside of the manifold of natural images. For example, in one test, delayed padding improved the interpolation results on the Middlebury benchmark examples with publicly known ground truth by 0.37 dB as compared padding the inputs prior to providing them to the neural network.

Figure 7:
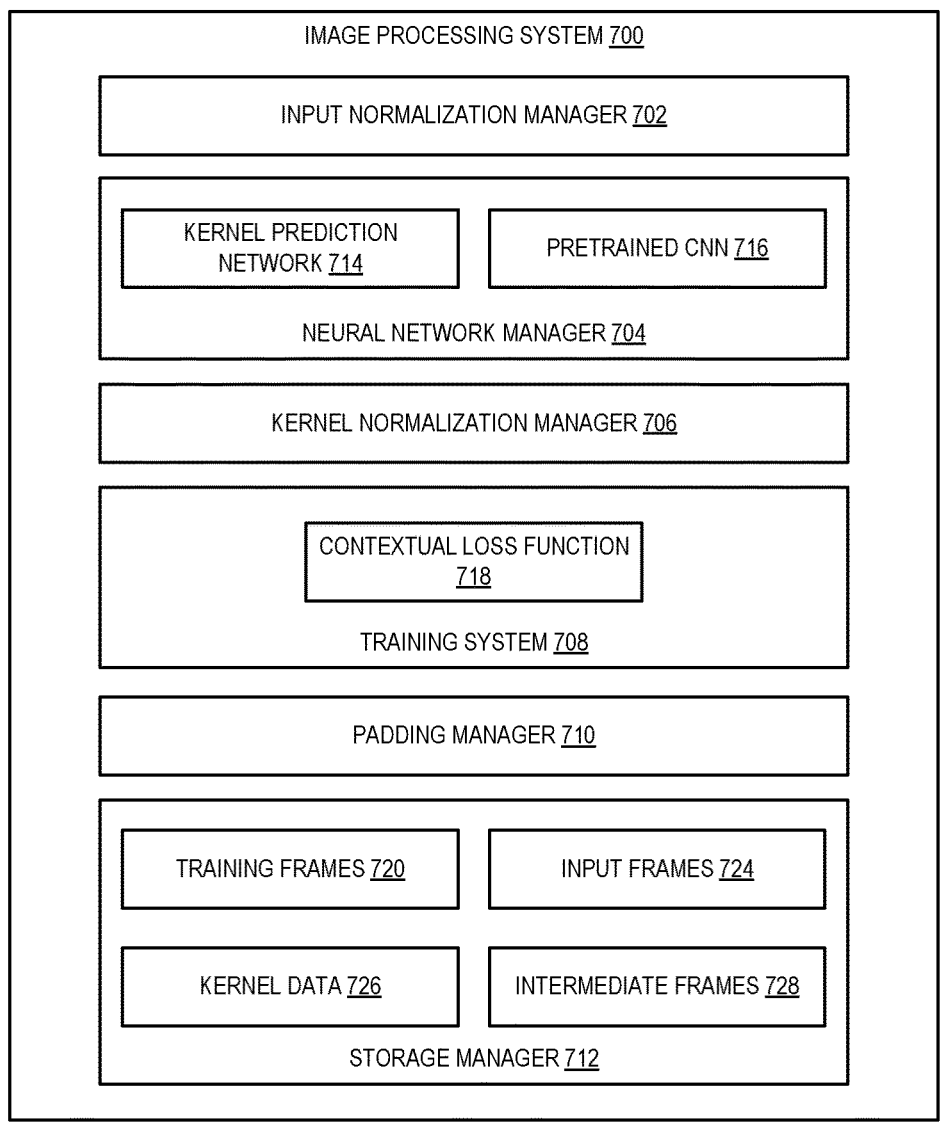
FIG. 7 illustrates a schematic diagram of an image processing system in accordance with one or more embodiments.

FIG. 7 illustrates a schematic diagram of an image processing system in accordance with one or more embodiments. In particular, FIG. 7 shows a schematic diagram of the image processing system 700, such as image processing system 100 described above. As shown, the image processing system includes, but is not limited to, an input normalization manager 702 (such as input normalization manager 105, discussed above), a neural network manager 704, a kernel normalization manager 706 (such as kernel normalization manager 110, discussed above), a training system 708 (such as training system 300, discussed above), a padding manager 710 (such as padding manager 604, discussed above), and a storage manager 712. Neural network manager 704 includes kernel prediction network 714 (such as neural network 106, discussed above) and pretrained CNN 716 (such as pretrained CNN 308, discussed above). Training system 708 includes contextual loss function 718. Storage manager 712 includes training frames 720, input frame 722, kernel data 726, and intermediate frames 728.

As shown in FIG. 7, the image processing system 700 includes input normalization manager 702. Input normalization manager 702 normalizes the input frames, such as input frames 724, by shifting and rescaling their intensity values to have zero mean and unit standard deviation. For example, in some embodiments, two input frames are normalized jointly while treating each color channel separately. That is, for each color channel, the input normalization manager 702 computes the mean and standard deviation of $I_1$ and $I_2$ as if they were one image. In some embodiments, the intermediate frame can be denormalized after it has been generated.

As further illustrated in FIG. 7, the image processing system 700 includes the neural network manager 704 that includes kernel prediction network 714 and pretrained CNN 716. As discussed, kernel prediction network 712 can be a neural network trained to estimate pairs of one-dimensional filter kernels $\langle K_{1,h}, K_{1,84}, K_{2,h}, K_{2,v} \rangle$ for each pixel in the output intermediate frame Î, such as one of intermediate frames 728. These one-dimensional filter kernel pairs are stored as part of kernel data 726. The one-dimensional filter kernels can be convolved to generate a two-dimensional filter kernel to be applied to the input frames to obtain the pixel value of the output intermediate frame, as discussed. In some embodiments, the kernel prediction network 714 includes an encoder-decoder network, such as a U-net architecture, as discussed above with respect at least to FIG. 2.

As further illustrated in FIG. 7, the image processing system 700 includes kernel normalization manager 706. Kernel normalization manager 706 obtains the one-dimensional kernel pairs, for example via storage manager 712, and then performs kernel normalization. As discussed, kernel normalization includes convolving the kernels output by kernel prediction network 714 with an image of equal size to the frames where the value of every pixel is '1'. The filtered input frames are then divided by the filtered masks to compensate for denormalized pixel weights, as discussed above.

As further illustrated in FIG. 7, the image processing system 700 includes training system 708 which is configured to teach, guide, tune, and/or train one or more neural networks. In particular, the training system 708 trains a neural network, such as kernel prediction network 714, based on a plurality of training data (e.g., training frames 720). In some embodiments, the training frames include frames of digital videos, including a first frame, an intermediate frame, and a second frame. The first frame and second frame are provided to the neural network which then learns to predict separable kernel coefficients which, when applied in an adaptive separable convolution operation φ, generate an intermediate frame. More specifically, the training system 708 configured to access, identify, generate, create, and/or determine training input and utilize the training input to train and fine-tune a neural network. For instance, the training system 708 trains the kernel prediction network to learn to predict spatially varying kernel coefficients using contextual loss function 718. Contextual loss function 718, as discussed above, compares the intermediate frame generated using the kernel prediction network 714 to the ground truth intermediate frame in both the color space and the contextual space. Training system 708 trains kernel prediction network 714 to minimize the contextual loss.

As further illustrated in FIG. 7, the image processing system 700 includes padding manager 710. As discussed, padding manager 710 receives the input frames and pads them using a padding scheme (such as mirror padding, zero padding, etc.). The padded input frames are then provided to kernel normalization manager 706 which performs an adaptive separable convolution operation φ on the padded frames using the spatially varying kernels that were predicted from the unpadded frames. This delayed padding improves interpolation quality and improves performance by the neural network as less data is being processed.

As illustrated in FIG. 7, the image processing system 700 also includes the storage manager 712. The storage manager 712 maintains data for the image processing system 700. The storage manager 712 can maintain data of any type, size, or kind as necessary to perform the functions of the image processing system 700. The storage manager 712, as shown in FIG. 7, includes the training frames 720. The training frames 720 can include a plurality of digital training frames associated with various digital training videos, as discussed in additional detail above. In particular, in one or more embodiments, the training frames 720 include a plurality of training triplets, each including a first training frame, an intermediate training frame, and a second training frame images. These training frames are utilized by the training system 708 to train one or more neural networks to predict kernel coefficients to synthesize an intermediate frame from the input training frames.

As further illustrated in FIG. 7, the storage manager 712 also includes input frames 724. Input frames 724 can include information for any digital image utilized by the image processing system 700. For example, input frames 724 includes pairs of consecutive frames from a digital video provided by a user, where the user seeks to synthesize an intermediate frame to, e.g., change the framerate of the video. The storage manager 712 may also include kernel data 726. The kernel data 726 may include a plurality of pairs of one-dimensional kernels output by the kernel prediction network and used by kernel normalization manager to synthesize an intermediate frame from the input frame pair. The storage manager 712 may further include intermediate frames 728, generated by the kernel normalization manager after performing adaptive separable convolution operations on the input frames using the one-dimensional kernel pairs and performing kernel normalization.

Each of the components 704-712 of the image processing system 700 and their corresponding elements (as shown in FIG. 7) may be in communication with one another using any suitable communication technologies. It will be recognized that although components 704-712 and their corresponding elements are shown to be separate in FIG. 7, any of components 704-712 and their corresponding elements may be combined into fewer components, such as into a single facility or module, divided into more components, or configured into different components as may serve a particular embodiment.

The components 704-712 and their corresponding elements can comprise software, hardware, or both. For example, the components 704-712 and their corresponding elements can comprise one or more instructions stored on a computer-readable storage medium and executable by processors of one or more computing devices. When executed by the one or more processors, the computer-executable instructions of the image processing system 700 can cause a client device and/or a server device to perform the methods described herein. Alternatively, the components 704-710 and their corresponding elements can comprise hardware, such as a special purpose processing device to perform a certain function or group of functions. Additionally, the components 704-710 and their corresponding elements can comprise a combination of computer-executable instructions and hardware.

Furthermore, the components 704-710 of the image processing system 700 may, for example, be implemented as one or more stand-alone applications, as one or more modules of an application, as one or more plug-ins, as one or more library functions or functions that may be called by other applications, and/or as a cloud-computing model. Thus, the components 704-710 of the image processing system 700 may be implemented as a stand-alone application, such as a desktop or mobile application. Furthermore, the components 704-710 of the image processing system 700 may be implemented as one or more web-based applications hosted on a remote server. Alternatively, or additionally, the components of the image processing system 700 may be implemented in a suit of mobile device applications or "apps." To illustrate, the components of the image processing system 700 may be implemented in a digital design application, including but not limited to ADOBE® PHOTOSHOP®, ADOBE® PREMIERE® PRO, etc., or a cloud-based suite of applications such as CREATIVE CLOUD®. "ADOBE®," "PHOTOSHOP®," "ADOBE PREMIERE®," and "CREATIVE CLOUD®" are either a registered trademark or trademark of Adobe Inc. in the United States and/or other countries.

FIG. 8 illustrates a chart 800 showing comparative performance of embodiments against prior techniques, in accordance with an embodiment. As discussed, embodiments implement various optimizations (e.g., kernel normalization, contextual training, input normalization, delayed padding, etc.) to simpler kernel-based frameworks. As shown in FIG. 8, embodiments are able to achieve near state-of-the-art quality when compared to much more complex frameworks. For example, embodiment 802 without self ensembling placed $3^{rd}$ of 10 in Middlebury, while embodiment 804 with self ensembling placed $2^{nd}$. As shown in FIG. 8, embodiments 802 and 804 are compared to competitive approaches for frame interpolation based on kernel prediction (SepConv [Simon Niklaus, Long Mai, and Feng Liu. Video Frame Interpolation via Adaptive Separable Convolution. In IEEE International Conference on Computer Vision, 2017.], EDSC [Xianhang Cheng and Zhenzhong Chen. Multiple Video Frame Interpolation via Enhanced Deformable Separable Convolution. arXiv/2006.08070, 2020], and AdaCoF [Hyeongmin Lee, Taeoh Kim, Tae-Young Chung, Daehyun Pak, Yuseok Ban, and Sangyoun Lee. AdaCoF: Adaptive Collaboration of Flows for Video Frame Interpolation. In IEEE Conference on Computer Vision and Pattern Recognition, 2020]), based on optical flow estimation and compensation (CtxSyn [Simon Niklaus and Feng Liu. Context-Aware Synthesis for Video Frame Interpolation. In IEEE Conference on Computer Vision and Pattern Recognition, 2018], DAIN [Wenbo Bao, Wei-Sheng Lai, Chao Ma, Xiaoyun Zhang, Zhiyong Gao, and Ming-Hsuan Yang. Depth-Aware Video Frame Interpolation. In IEEE Conference on Computer Vision and Pattern Recognition, 2019], Soft-Splat [Simon Niklaus and Feng Liu. Softmax Splatting for Video Frame Interpolation. In IEEE Conference on Computer Vision and Pattern Recognition, 2020], and BMBC [Junheum Park, Keunsoo Ko, Chul Lee, and Chang-Su Kim. BMBC: Bilateral Motion Estimation With Bilateral Cost Volume for Video Interpolation. In European Conference on Computer Vision, 2020]), and based on directly synthesizing the intermediate frame (CAIN [Myungsub Choi, Heewon Kim, Bohyung Han, Ning Xu, and Kyoung Mu Lee. Channel Attention Is All You Need for Video Frame Interpolation. In AAAI Conference on Artificial Intelligence, 2020]). In summary, embodiments are only outperformed in the Middlebury benchmark by SoftSplat. However, SoftSplat was additionally supervised on training data with ground truth optical flow, whereas embodiments were solely supervised on the Vimeo-90k dataset.

Figure 9:
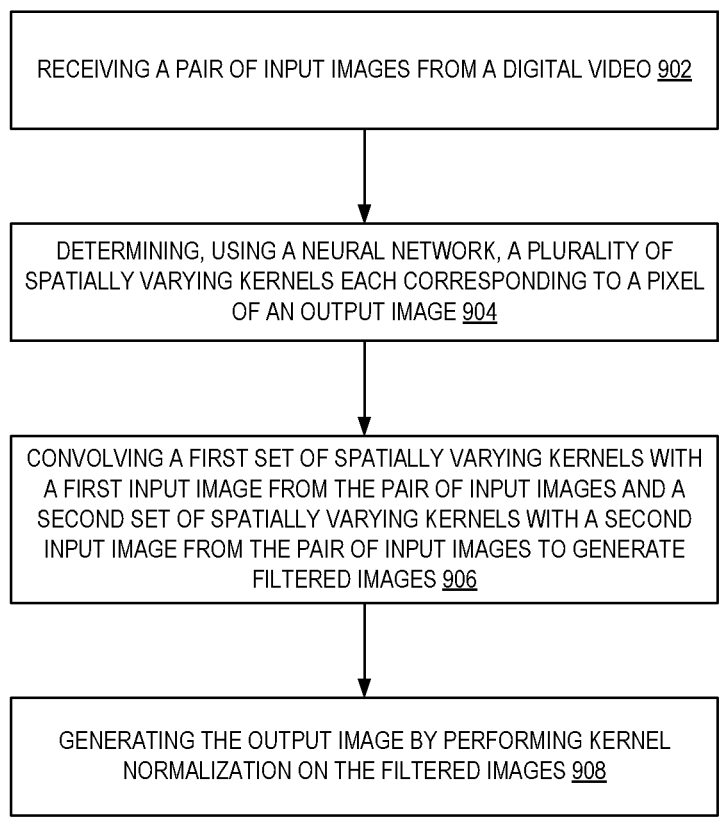
FIG. 9 illustrates a flowchart of a series of acts in a method of video frame interpolation in accordance with one or more embodiments.

FIGS. 1-8, the corresponding text, and the examples, provide a number of different systems and devices that enable digital frame interpolation. In addition to the foregoing, embodiments can also be described in terms of flowcharts comprising acts and steps in a method for accomplishing a particular result. For example, FIG. 9 illustrates a flowchart of an exemplary method in accordance with one or more embodiments. The method described in relation to FIG. 9 may be performed with fewer or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart 900 of a series of acts in a method of video frame interpolation in accordance with one or more embodiments. In one or more embodiments, the method 900 is performed in a digital medium environment that includes the image processing system 700. The method 900 is intended to be illustrative of one or more methods in accordance with the present disclosure and is not intended to limit potential embodiments. Alternative embodiments can include additional, fewer, or different steps than those articulated in FIG. 9.

As illustrated in FIG. 9, the method 900 includes an act 902 of receiving a pair of input images from a digital video. For example, each input image may be a frame from a digital video. In some embodiments, the pair of input images are consecutive frames extracted from the input digital video. For example, a user may provide a digital video to the image processing system to change the frame rate of the digital video. The image processing system can then extract consecutive frames and provide pairs of consecutive frames as input. Alternatively, the input images may be arbitrary images. For example, interpolation may be performed between two views of a stereo camera.

As illustrated in FIG. 9, the method 900 includes an act 904 of determining, using a neural network, a plurality of spatially varying kernels each corresponding to a pixel of an output image. As discussed, the neural network may be a kernel prediction network trained to estimate kernel coefficients based on the input images. In some embodiments, the neural network is trained by obtaining a pair of training images and a ground truth image, generating an output training image based on the pair of training images using the neural network, generating a feature representation of the output intermediate training image and the ground truth image using a pretrained neural network, and minimizing a contextual loss function calculated from the output training image, the ground truth image, the feature representation of the output training image, and the feature representation of the ground truth image. As discussed, the contextual loss function factors in both a comparison of the output image to the ground truth image in color space and in contextual space. This forces the neural network to learn to make predictions based on the actual motion between the input images. In some embodiments, determining the kernels includes estimating, by the neural network, kernel coefficients for a plurality of pairs of one-dimensional kernels, and convolving each pair of one-dimensional kernels to generate the plurality of spatially varying kernels.

As illustrated in FIG. 9, the method 900 includes an act 906 of convolving a first set of spatially varying kernels with a first input image from the pair of input images and a second set of spatially varying kernels with a second input image from the pair of input images to generate filtered images. In some embodiments, this convolving includes performing adaptive separable convolution on the first input image using the first set of spatially varying kernels and performing adaptive separable convolution on the second input image using the second set of spatially varying kernels. In some embodiments, this convolving is performed on padded input images. For example, this delayed padding can include generating a padded first input image and a padded second input image and convolving the first padded input image with the first set of spatially varying kernels and the second padded input image with the second set of spatially varying kernels to generate the filtered images. As discussed, delayed padding may be performed using a padding scheme, such as mirror padding, zero padding, etc.

As illustrated in FIG. 9, the method 900 includes an act 908 of generating the output image by performing kernel normalization on the filtered images. In some embodiments, kernel normalization further includes convolving the first set of filters with a first singular mask to generate a first filtered mask, convolving the second set of filters with a second singular mask to generate a second filtered mask, and dividing the filtered images by the first and second filtered masks. As discussed, when using separable kernels, the kernel coefficients cannot be constrained to add up to 1, which may result in the output image appearing brighter or darker than the input images. Kernel normalization has the effect of enforcing such a constraint on separable kernels as a post processing step and improves interpolation quality. In some embodiments, the kernel coefficients correspond to a filter kernel for video frame interpolation and wherein the output image is an output intermediate image. In some embodiments, the kernel coefficients correspond to a denoising kernel or a deblurring kernel.

In some embodiments, the method further includes transforming the first input image and the second input image to generate transformed input images, determining, by the neural network, a second plurality of spatially varying kernels corresponding to a pixel of a second output image, convolving a first set of spatially varying kernels from the second plurality of spatially varying kernels with a first transformed input image from the pair of transformed input images and a second set of spatially varying kernels from the second plurality of spatially varying kernels with a second transformed input image from the pair of transformed input images to generate second filtered images, generating the second output image by performing kernel normalization on the second filtered images, and combining the output image and the second output image. As discussed, this self ensembling can be performed on a plurality of predictions based on different transformations, such as mirroring, rotating, etc. The interpolation results from multiple transformed inputs are combined (e.g., by taking the mean, median, or other techniques for merging interpolation results), leading to improved interpolation results.

Figure 10:
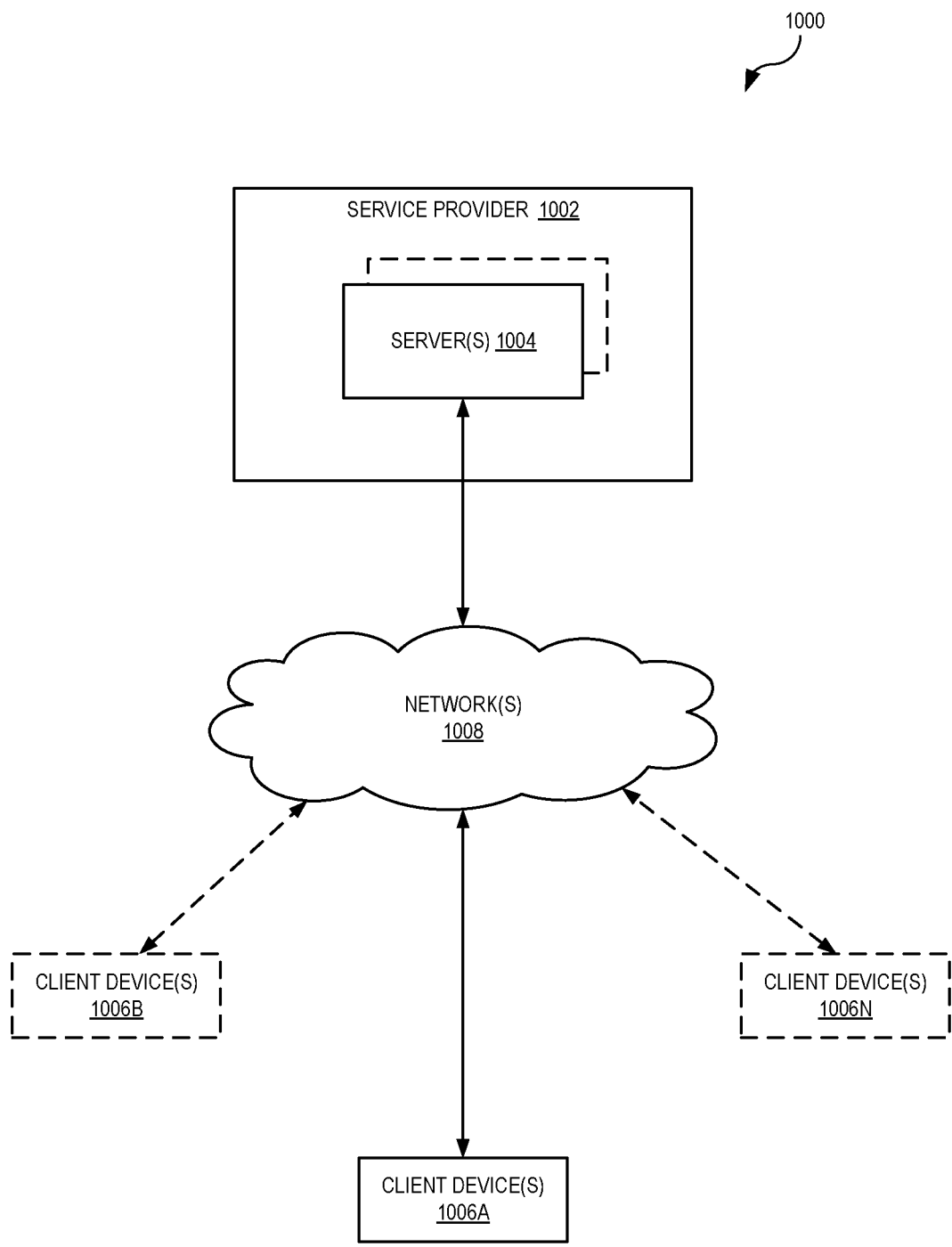
FIG. 10 illustrates a schematic diagram of an exemplary environment in which the image processing system can operate in accordance with one or more embodiments.

FIG. 10 illustrates a schematic diagram of an exemplary environment 1000 in which the image processing system 700 can operate in accordance with one or more embodiments. In one or more embodiments, the environment 1000 includes a service provider 1002 which may include one or more servers 1004 connected to a plurality of client devices 1006A-1006N via one or more networks 1008. The client devices 1006A-1006N, the one or more networks 1008, the service provider 1002, and the one or more servers 1004 may communicate with each other or other components using any communication platforms and technologies suitable for transporting data and/or communication signals, including any known communication technologies, devices, media, and protocols supportive of remote data communications, examples of which will be described in more detail below with respect to FIG. 11.

Although FIG. 10 illustrates a particular arrangement of the client devices 1006A-1006N, the one or more networks 1008, the service provider 1002, and the one or more servers 1004, various additional arrangements are possible. For example, the client devices 1006A-1006N may directly communicate with the one or more servers 1004, bypassing the network 1008. Or alternatively, the client devices 1006A-1006N may directly communicate with each other. The service provider 1002 may be a public cloud service provider which owns and operates their own infrastructure in one or more data centers and provides this infrastructure to customers and end users on demand to host applications on the one or more servers 1004. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1004. In some embodiments, the service provider may be a private cloud provider which maintains cloud infrastructure for a single organization. The one or more servers 1004 may similarly include one or more hardware servers, each with its own computing resources, which are divided among applications hosted by the one or more servers for use by members of the organization or their customers.

Similarly, although the environment 1000 of FIG. 10 is depicted as having various components, the environment 1000 may have additional or alternative components. For example, the environment 1000 can be implemented on a single computing device with the image processing system 700. In particular, the image processing system 700 may be implemented in whole or in part on the client device 1002A.

As illustrated in FIG. 10, the environment 1000 may include client devices 1006A-1006N. The client devices 1006A-1006N may comprise any computing device. For example, client devices 1006A-1006N may comprise one or more personal computers, laptop computers, mobile devices, mobile phones, tablets, special purpose computers, TVs, or other computing devices, including computing devices described below with regard to FIG. 11. Although three client devices are shown in FIG. 10, it will be appreciated that client devices 1006A-1006N may comprise any number of client devices (greater or smaller than shown).

Moreover, as illustrated in FIG. 10, the client devices 1006A-1006N and the one or more servers 1004 may communicate via one or more networks 1008. The one or more networks 1008 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1008 may be any suitable network over which the client devices 1006A-1006N may access service provider 1002 and server 1004, or vice versa. The one or more networks 1008 will be discussed in more detail below with regard to FIG. 11.

In addition, the environment 1000 may also include one or more servers 1004. The one or more servers 1004 may generate, store, receive, and transmit any type of data, including training frames 720, input frames 722, kernel data 726, intermediate frames 728, or other information. For example, a server 1004 may receive data from a client device, such as the client device 1006A, and send the data to another client device, such as the client device 1002B and/or 1002N. The server 1004 can also transmit electronic messages between one or more users of the environment 1000. In one example embodiment, the server 1004 is a data server. The server 1004 can also comprise a communication server or a web-hosting server. Additional details regarding the server 1004 will be discussed below with respect to FIG. 11.

As mentioned, in one or more embodiments, the one or more servers 1004 can include or implement at least a portion of the image processing system 700. In particular, the image processing system 700 can comprise an application running on the one or more servers 1004 or a portion of the image processing system 700 can be downloaded from the one or more servers 1004. For example, the image processing system 700 can include a web hosting application that allows the client devices 1006A-1006N to interact with content hosted at the one or more servers 1004. To illustrate, in one or more embodiments of the environment 1000, one or more client devices 1006A-1006N can access a webpage supported by the one or more servers 1004. In particular, the client device 1006A can run a web application (e.g., a web browser) to allow a user to access, view, and/or interact with a webpage or website hosted at the one or more servers 1004.

Upon the client device 1006A accessing a webpage or other web application hosted at the one or more servers 1004, in one or more embodiments, the one or more servers 1004 can provide access to one or more digital video frames (e.g., the input frames 724, an individual's personal videos or other video source) stored at the one or more servers 1004. Moreover, the client device 1006A can receive a request (i.e., via user input) to perform frame interpolation and provide the request to the one or more servers 1004. Upon receiving the request, the one or more servers 1004 can automatically perform the methods and processes described above to synthesize intermediate frames based on the frames of a provided digital video. The one or more servers 1004 can provide the interpolated digital video including the interpolated frames, to the client device 1006A for display to the user.

As just described, the image processing system 700 may be implemented in whole, or in part, by the individual elements 1002-1008 of the environment 1000. It will be appreciated that although certain components of the image processing system 700 are described in the previous examples with regard to particular elements of the environment 1000, various alternative implementations are possible. For instance, in one or more embodiments, the image processing system 700 is implemented on any of the client devices 1006A-N. Similarly, in one or more embodiments, the image processing system 700 may be implemented on the one or more servers 1004. Moreover, different components and functions of the image processing system 700 may be implemented separately among client devices 1006A-1006N, the one or more servers 1004, and the network 1008.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
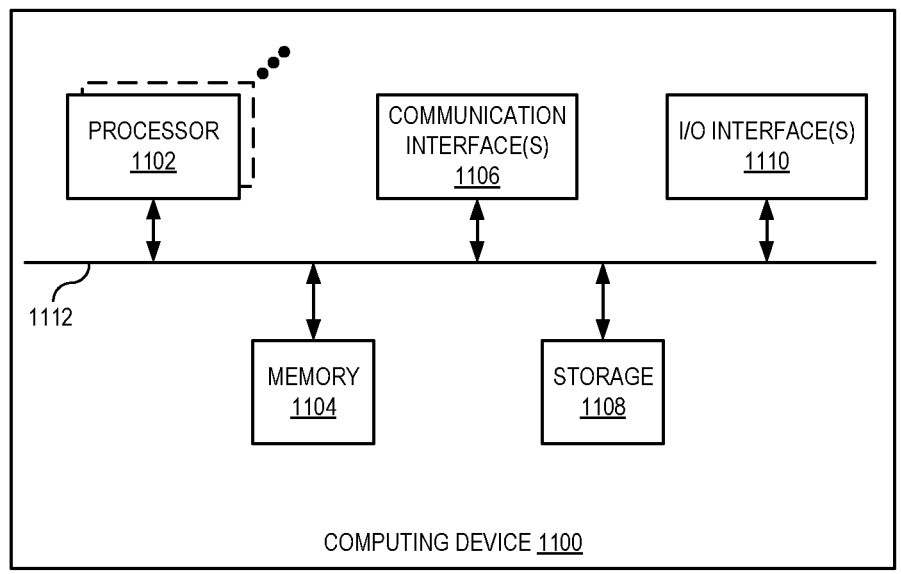
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the image processing system. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example, and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
    receiving a pair of input images from a digital video;
    determining, using a neural network, a plurality of spatially varying kernels each corresponding to a pixel of an output image;
    convolving a first set of spatially varying kernels with a first input image from the pair of input images and a second set of spatially varying kernels with a second input image from the pair of input images to generate filtered images;
    generating a first filtered mask by convolving the first set of spatially varying kernels with a first singular mask;
    generating a second filtered mask by convolving the second set of spatially varying kernels with a second singular mask; and
    generating the output image by dividing the filtered images by the first and second filtered masks.

2. The computer-implemented method of claim 1, wherein determining, using a neural network, a plurality of spatially varying kernels each corresponding to a pixel of an output image, further comprises:
    estimating, by the neural network, kernel coefficients for a plurality of pairs of one-dimensional kernels; and
    convolving each pair of one-dimensional kernels to generate the plurality of spatially varying kernels.

3. The computer-implemented method of claim 1, further comprising:
    transforming the first input image and the second input image to generate a pair of transformed input images;
    determining, by the neural network, a second plurality of spatially varying kernels corresponding to a pixel of a second output image;
    convolving a first set of spatially varying kernels from the second plurality of spatially varying kernels with a first transformed input image from the pair of transformed input images and a second set of spatially varying kernels from the second plurality of spatially varying kernels with a second transformed input image from the pair of transformed input images to generate second filtered images;
    generating the second output image by performing kernel normalization on the second filtered images; and
    combining the output image and the second output image.

4. The computer-implemented method of claim 1, wherein convolving a first set of spatially varying kernels with a first input image from the pair of input images and a second set of spatially varying kernels with a second input image from the pair of input images to generate a filtered image, further comprises:
    performing adaptive separable convolution on the first input image using the first set of spatially varying kernels; and
    performing adaptive separable convolution on the second input image using the second set of spatially varying kernels.

5. The computer-implemented method of claim 1, wherein the neural network is trained by:
    obtaining a pair of training images and a ground truth image;
    generating an output training image based on the pair of training images using the neural network;
    generating a feature representation of the output training image and the ground truth image using a pretrained neural network; and
    minimizing a contextual loss function calculated from the output training image, the ground truth image, the feature representation of the output training image, and the feature representation of the ground truth image.

6. The computer-implemented method of claim 1, wherein convolving a first set of spatially varying kernels with a first input image from the pair of input images and a second set of spatially varying kernels with a second input image from the pair of input images to generate filtered images, further comprises:
- generating a padded first input image and a padded second input image; and
- convolving the first padded input image with the first set of spatially varying kernels and the second padded input image with the second set of spatially varying kernels to generate the filtered images.

7. The computer-implemented method of claim 1, wherein the plurality of spatially varying kernels are filter kernels for video image interpolation and wherein the output image is an output intermediate image.

8. The computer-implemented method of claim 1, wherein the plurality of spatially varying kernels are denoising kernels or deblurring kernels.

9. A non-transitory computer-readable storage medium including instructions stored thereon which, when executed by at least one processor, cause the at least one processor to:
- receive a pair of input images from a digital video;
- determine, using a neural network, a plurality of spatially varying kernels each corresponding to a pixel of an output image;
- convolve a first set of spatially varying kernels with a first input image from the pair of input images and a second set of spatially varying kernels with a second input image from the pair of input images to generate filtered images;
- generate a first filtered mask by convolving the first set of spatially varying kernels with a first singular mask;
- generate a second filtered mask by convolving the second set of spatially varying kernels with a second singular mask; and
- generate the output image by dividing the filtered images by the first and second filtered masks.

10. The non-transitory computer-readable storage medium of claim 9, wherein to determine, using a neural network, a plurality of spatially varying kernels each corresponding to a pixel of an output image, the instructions, when executed, further cause the at least one processor to:
- estimate, by the neural network, kernel coefficients for a plurality of pairs of one-dimensional kernels; and
- convolve each pair of one-dimensional kernels to generate the plurality of spatially varying kernels.

11. The non-transitory computer-readable storage medium of claim 9, wherein the instructions, when executed, further cause the at least one processor to:
- transform the first input image and the second input image to generate a pair of transformed input images;
- determine, by the neural network, a second plurality of spatially varying kernels corresponding to a pixel of a second output image;
- convolve a first set of spatially varying kernels from the second plurality of spatially varying kernels with a first transformed input image from the pair of transformed input images and a second set of spatially varying kernels from the second plurality of spatially varying kernels with a second transformed input image from the pair of transformed input images to generate second filtered images;
- generate the second output image by performing kernel normalization on the second filtered images; and
- combine the output image and the second output image.

12. The non-transitory computer-readable storage medium of claim 9, wherein to convolve a first set of spatially varying kernels with a first input image from the pair of input images and a second set of spatially varying kernels with a second input image from the pair of input images to generate a filtered image, the instructions, when executed, further cause the at least one processor to:
- perform adaptive separable convolution on the first input image using the first set of spatially varying kernels; and
- perform adaptive separable convolution on the second input image using the second set of spatially varying kernels.

13. The non-transitory computer-readable storage medium of claim 9, wherein the neural network is trained by:
- obtaining a pair of training images and a ground truth image;
- generating an output training image based on the pair of training images using the neural network;
- generating a feature representation of the output training image and the ground truth image using a pretrained neural network; and
- minimizing a contextual loss function calculated from the output training image, the ground truth image, the feature representation of the output training image, and the feature representation of the ground truth image.

14. The non-transitory computer-readable storage medium of claim 9, wherein to convolve a first set of spatially varying kernels with a first input image from the pair of input images and a second set of spatially varying kernels with a second input image from the pair of input images to generate filtered images, the instructions, when executed, further cause the at least one processor to:
- generate a padded first input image and a padded second input image; and
- convolve the first padded input image with the first set of spatially varying kernels and the second padded input image with the second set of spatially varying kernels to generate the filtered images.

15. A system comprising:
- one or more electronic devices including at least one processor and memory, the one or more electronic devices implementing an image processing system including instructions which, when executed by the at least one processor, cause the image processing system to:
- receive a pair of input images from a digital video;
- determine, using a neural network, a plurality of spatially varying kernels each corresponding to a pixel of an output image;
- convolve a first set of spatially varying kernels with a first input image from the pair of input images and a second set of spatially varying kernels with a second input image from the pair of input images to generate filtered images;
- generate a first filtered mask by convolving the first set of spatially varying kernels with a first singular mask;
- generate a second filtered mask by convolving the second set of spatially varying kernels with a second singular mask; and
- generate the output image by dividing the filtered images by the first and second filtered masks.

16. The system of claim 15, wherein to determine, using a neural network, a plurality of spatially varying kernels each corresponding to a pixel of an output image, the instructions, when executed, further cause the image processing system to:
- estimate, by the neural network, kernel coefficients for a plurality of pairs of one-dimensional kernels; and convolve each pair of one-dimensional kernels to generate the plurality of spatially varying kernels.

17. The system of claim 15, wherein the instructions, when executed, further cause the image processing system to:
- transform the first input image and the second input image to generate a pair of transformed input images;
- determine, by the neural network, a second plurality of spatially varying kernels corresponding to a pixel of a second output image;
- convolve a first set of spatially varying kernels from the second plurality of spatially varying kernels with a first transformed input image from the pair of transformed input images and a second set of spatially varying kernels from the second plurality of spatially varying kernels with a second transformed input image from the pair of transformed input images to generate second filtered images;
- generate the second output image by performing kernel normalization on the second filtered images; and
- combine the output image and the second output image.

18. The system of claim 15, wherein to convolve a first set of spatially varying kernels with a first input image from the pair of input images and a second set of spatially varying kernels with a second input image from the pair of input images to generate a filtered image, the instructions, when executed, further cause the image processing system to:
- perform adaptive separable convolution on the first input image using the first set of spatially varying kernels; and
- perform adaptive separable convolution on the second input image using the second set of spatially varying kernels.

* * * * *